United States Patent
Kim et al.

(10) Patent No.: US 7,315,534 B2
(45) Date of Patent: Jan. 1, 2008

(54) CHANNEL TIME ALLOCATION METHOD AND APPARATUS

(75) Inventors: In-hwan Kim, Suwon-si (KR); Nam-hyong Kim, Suwon-si (KR); Ju-han Lee, Suwon-si (KR); Ho-jeong You, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 496 days.

(21) Appl. No.: 10/942,955

(22) Filed: Sep. 17, 2004

(65) Prior Publication Data

US 2005/0063414 A1  Mar. 24, 2005

(30) Foreign Application Priority Data

Sep. 18, 2003 (KR) .............. 10-2003-0064725

(51) Int. Cl.
*H04Q 7/24* (2006.01)
(52) U.S. Cl. ............ 370/342; 370/341; 370/346; 370/445
(58) Field of Classification Search ............... None
See application file for complete search history.

(56) References Cited

U.S. PATENT DOCUMENTS

| 5,737,330 | A | 4/1998 | Fulthorp et al. |
| 6,459,692 | B1 | 10/2002 | Ben-Michael et al. |
| 6,980,541 | B2 * | 12/2005 | Shvodian ............ 370/346 |
| 2002/0087674 | A1 * | 7/2002 | Guilford et al. ......... 709/223 |
| 2002/0174234 | A1 * | 11/2002 | Trovato et al. ......... 709/227 |

FOREIGN PATENT DOCUMENTS

JP 11-205352 A 7/1999

* cited by examiner

*Primary Examiner*—Erika A. Gary
(74) *Attorney, Agent, or Firm*—Sughrue Mion Pllc.

(57) ABSTRACT

Provided are a channel time allocation method and apparatus adopting the same. The channel time allocation method includes: (a) receiving a request of registering in a network from a device; (b) determining whether the network supplying a service required by the device exists; and (c) if the network supplying the requested service exists, performing a procedure of registering in the network, and if the network supplying the requested service does not exist, generating a new network. Since existing MAC protocols can be used in the channel time allocation method, an optimum service is provided in a network environment in which different kinds of services coexist.

18 Claims, 7 Drawing Sheets

CHANNEL TIME ALLOCATION METHOD AND APPARATUS

BACKGROUND OF THE INVENTION

This application claims the priority of Korean Patent Application No. 2003-64725, filed on Sep. 18, 2003, in the Korean Intellectual Property Office, the disclosure of which is incorporated herein in its entirety by reference.

1. Field of the Invention

The present invention relates to a wireless communication system, and more particularly, a channel time allocation method and apparatus according to characteristics of applications.

2. Description of the Related Art

A medium access control (MAC) protocol used in wireless communication systems adopts a carrier sense multiple access with collision avoidance (CSMA/CA) method and a time division multiple access (TDMA) method, in which a frequency band is shared between a plurality of users, according to its application. The CSMA/CA method includes generating a random number for each terminal, selecting a channel after a time equivalent to the random number, and using the channel if other terminals are not using the channel. Therefore, quality of service (QoS) does not depend on a terminal type or a transmission data type. However, the TDMA method allocates unique time slots with equal periods to each terminal on a given channel. Therefore, QoS does not depend on a terminal type or a transmission data type.

FIG. 1 illustrates a network topology according to the IEEE 802.15.3 standard.

A network includes a plurality of devices 101 through 104 and a piconet coordinator (PNC) 105 which relays and manages data and commands among the devices 101 through 104. A piconet is a network made up of a plurality of devices and a PNC. The devices may be home appliances, such as TVs and camcoders, and any of the devices can be the PNC 105. However, in general, an audio/video (AV) receiver or a computer is the PNC 105. The PNC 105 receives a channel time request command from each of the devices 101 through 104 and allocates a channel time to each of the devices 101 through 104. Each of the devices 101 through 104 directly transmits data to other devices at the allocated channel time. The PNC 105 also performs power save mode management and authentication management. Through the authentication management, the PNC 105 distributes a key for protecting a payload, and each of the devices 101 through 104 transmits and receives encrypted data using the allocated timeslot and the distributed key.

Each device used in the IEEE 802.15.3 standard smoothly enters and withdraws from a network, and in particular, it is preferable that a network entry time is less than one second. A MAC protocol of the IEEE 802.15.3 standard uses the TDMA method to guarantee QoS of streaming data.

FIG. 2 illustrates a configuration of a superframe to which a channel time is allocated.

The superframe includes a beacon 201, a contention access period (CAP) 202, two management channel time allocations (MCTAs) 203 and 204, and a plurality of channel time allocations (CTAs) 205 through 207. The beacon 201 is control information (an overhead) for transmitting data. The CAP 202 represents allocation of a channel time by contention, and a random access control based on the CSMA/CA is performed in the CAP 202. The MCTAs 203 and 204 are used for managing the plurality of CTAs 205 through 207. Payloads to be transmitted are allocated to the plurality of CTAs 205 through 207. Since one device can transmit several kinds of streams, a plurality of CTAs can exist. Synchronous data, such as an A/V stream, can be transmitted by obtaining a timeslot in a CTA, and asynchronous data can also be transmitted in a required band according to data size.

Since a TDMA MAC protocol is designed to be suitable for transmitting/receiving multimedia data, the TDMA MAC protocol cannot properly allocate existing asynchronous data. That is, when the existing asynchronous data should be transmitted, the asynchronous data can only be transmitted in a CAP field or a CTA field allocated during a contention free period (CFP).

On the other hand, since a CSMA/CA TDMA MAC protocol is designed to be suitable for transmitting/receiving asynchronous data, the CSMA/CA TDMA MAC protocol cannot properly allocate multimedia data. That is, when isochronous data should be transmitted, since the isochronous data is transmitted in a CAP field, QoS of jitter or delay is not guaranteed.

The IEEE 802.15.3 standard provides a method of handling a dependent piconet, such as a child piconet and a neighbor piconet. Accordingly, a private time that allocates a portion of a timeslot to each group and makes each group using the dependent piconet use the timeslot is used. However, in the dependent piconet, except for a PNC, no member of the dependent piconet can perform communication with any member of a parent piconet.

SUMMARY OF THE INVENTION

The present invention provides a channel time allocation method and apparatus adopting a CSMA/CA or TDMA method according to characteristics of an application and guaranteeing a QoS suitable for the characteristics by grouping a plurality of devices according to QoS characteristics of applications supplied by the devices.

The present invention also provides a channel time allocation method and apparatus which allow for a CSMA/CA method and a TDMA method to coexist in a network, and in which a suitable MAC protocol is used according to characteristics of applications using the CSMA/CA and TDMA methods.

According to an aspect of the present invention, there is provided a channel time allocation method comprising: (a) receiving a request of registering in a network from a device; (b) determining whether the network supplying a service required by the device exists; and (c) if the network supplying the requested service exists, performing a procedure of registering in the network, and if the network supplying the requested service does not exist, generating a new network.

In an exemplary embodiment, the network is a piconet and the new network is a neighbor piconet of a parent piconet.

In an exemplary embodiment, in step (c), the neighbor piconet is generated by obtaining a channel time allocation (CTA) from the parent piconet.

In an exemplary embodiment, the method furthermore comprises playing a role of a piconet coordinator (PNC) of the neighbor piconet by the device after the neighbor piconet is generated.

In an exemplary embodiment, the neighbor piconet uses a medium access control (MAC) protocol different from that used in the parent piconet.

According to another aspect of the present invention, there is provided a channel time allocation apparatus comprising: a allocating unit which receives a register request from a device and performs a registering procedure; a piconet generator which generates a neighbor piconet when a piconet supplying a service required by the device does not exist; a PNC operator which makes the device play a role of a PNC of the neighbor piconet after the neighbor piconet is generated and operate as a PNC; and a MAC operator which makes the PNC of the neighbor piconet apply a MAC protocol suitable for characteristics of the service.

In an exemplary embodiment, the piconet generator generates the neighbor piconet by obtaining a CTA from a parent piconet.

In an exemplary embodiment, the MAC operator uses a MAC protocol different from that used in the parent piconet.

According to another aspect of the present invention, there is provided a computer readable medium having recorded thereon a computer readable program for performing the method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described with reference to the accompanying drawings, in which an exemplary embodiment of the present invention is shown.

Figure 1:
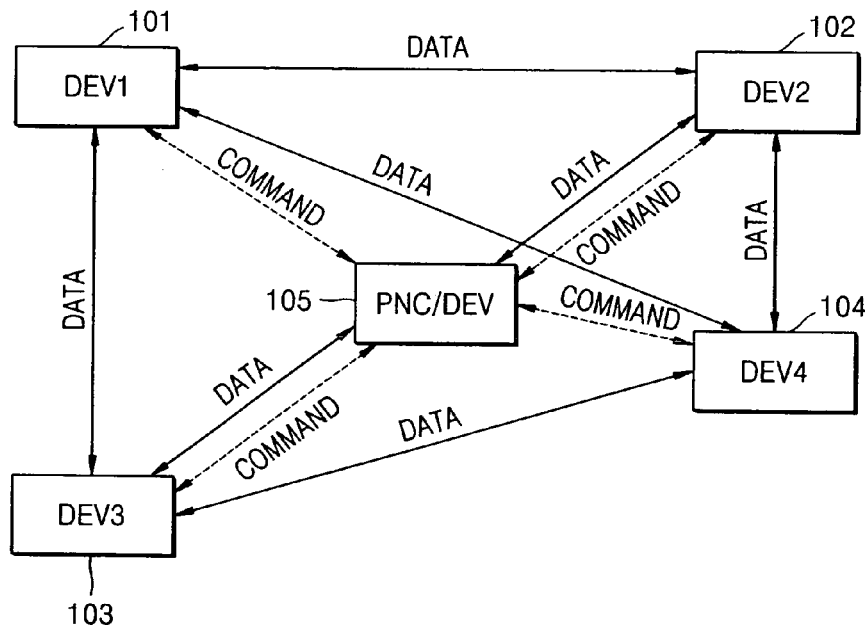
FIG. 1 illustrates a network topology according to the IEEE 802.15.3 standard.
Figure 2:
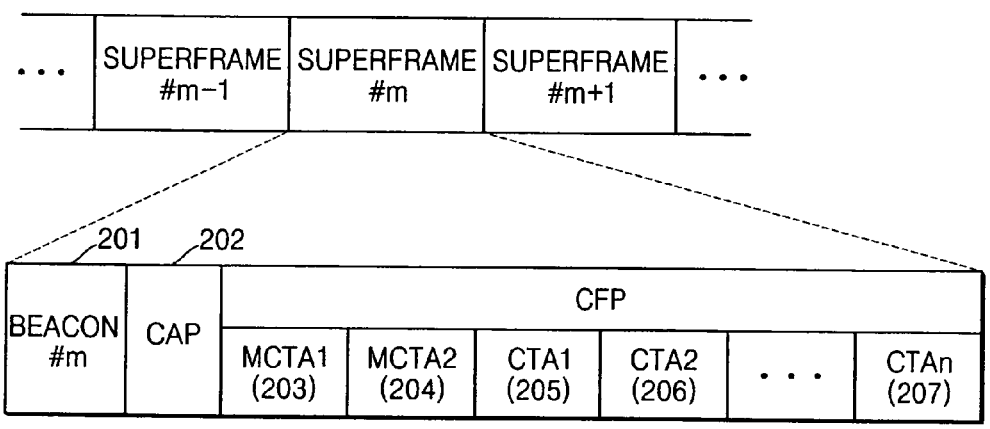
FIG. 2 illustrates a configuration of a superframe in which a channel time is allocated.
Figure 3:
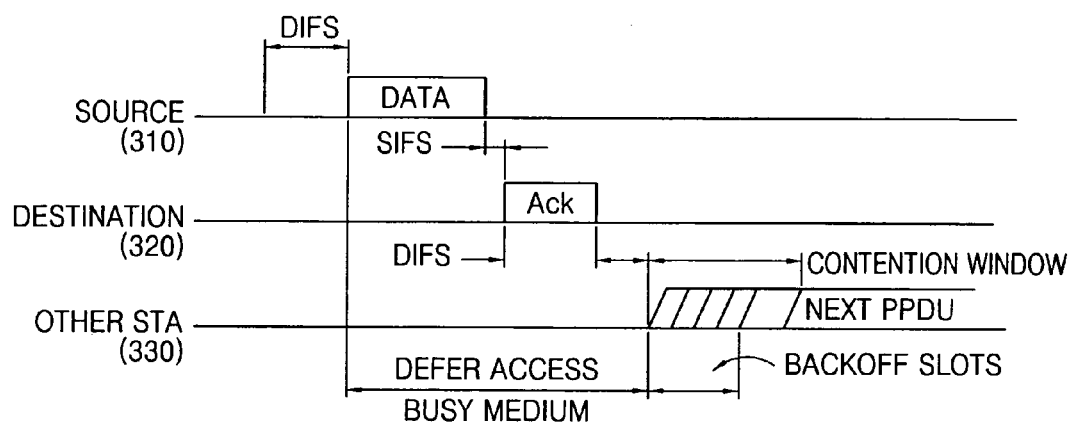
FIG. 3 is a timing diagram illustrating a configuration of a frame used in a CSMA/CA MAC protocol.

FIG. 3 is a timing diagram illustrating a configuration of a frame used in a CSMA/CA MAC protocol.

When a neighbor piconet cannot use a physical channel, the neighbor piconet uses frequency bands of two piconets (the neighbor piconet and a parent piconet). The neighbor piconet has an independent piconet ID (PNID) and operates independently, but relies on a private CTA of the parent piconet.

Referring to FIG. 3, a case where a source device 310 intends to transmit data to a destination device 320 will now be described.

The source device 310 transmits the data using a channel time allocated by a channel PNC. The destination device 320 receives the data and transmits an acknowledge (ACK) message to the source device 310. Other station 330, i.e., any other devices in the same network, waits during the communication time.

Figure 4:
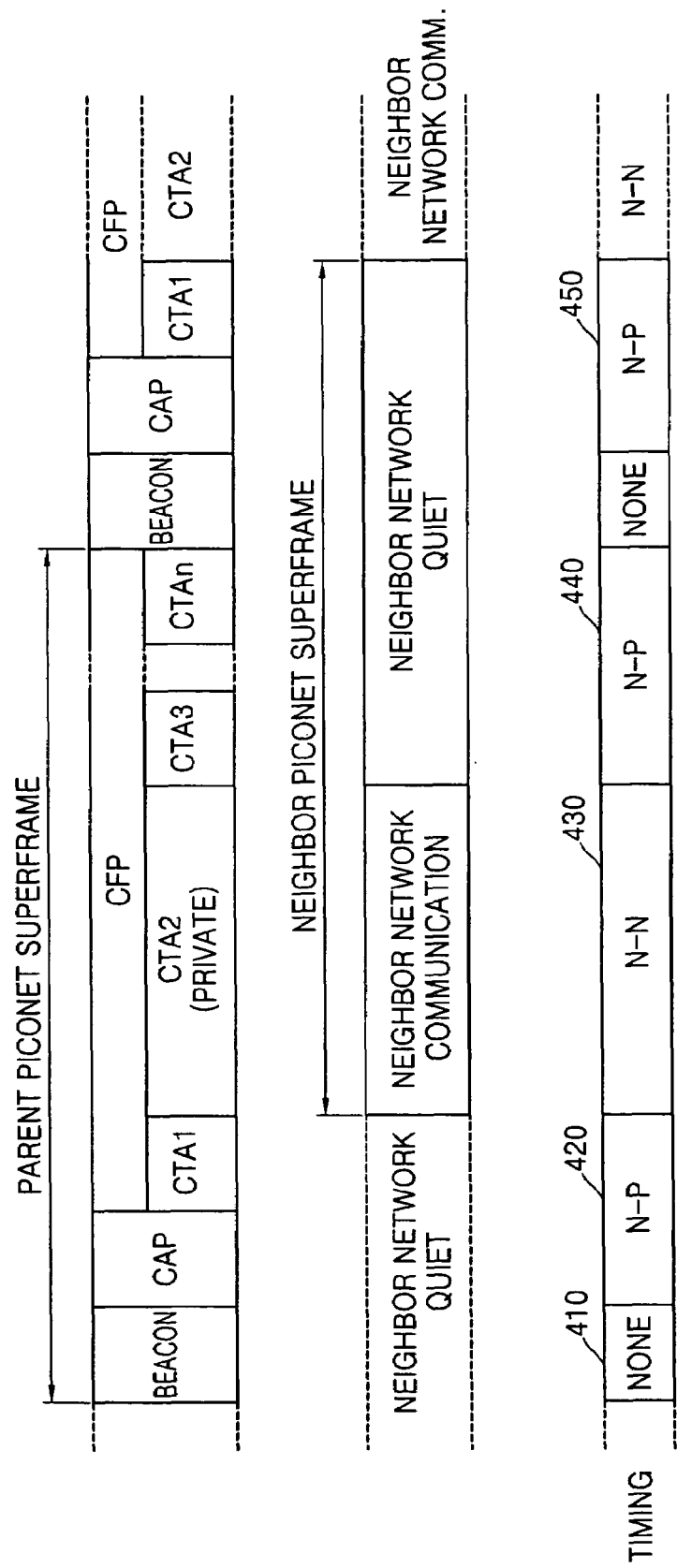
FIG. 4 illustrates configurations of superframes of a parent piconet and a neighbor piconet.

FIG. 4 illustrates configurations of superframes of a parent piconet and a neighbor piconet.

In communication between piconet devices, asynchronous data is transmitted during a CAP. Also, communication between the piconet devices is performed during channel periods of isochronous streams and channel times for the asynchronous data allocated to a contention free period (CFP).

Referring to FIG. 4, channel timing is divided into a NONE division 410 in which communication is not performed, an N-P division 420 in which communication between a parent PNC and a neighbor PNC is performed, an N-N division 430 in which communication between devices of the neighbor PNC is performed, and an N-P division 440 in which communication between the parent PNC and the neighbor PNC is performed.

Figure 5:
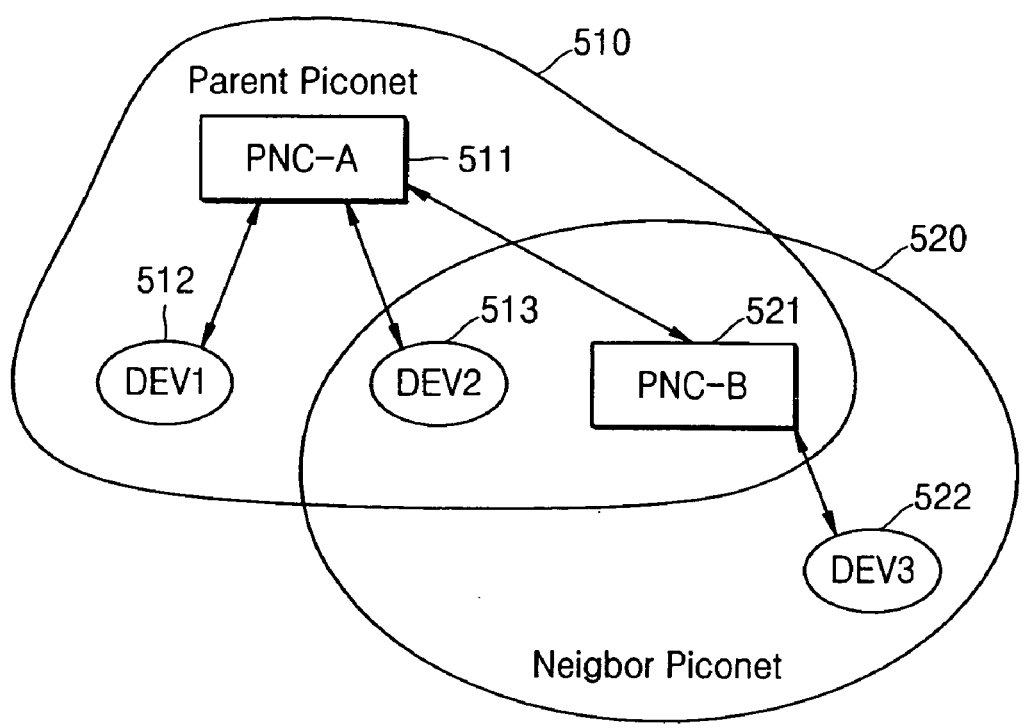
FIG. 5 illustrates a relationship between a parent piconet and a neighbor piconet.

FIG. 5 illustrates a relationship between a parent piconet and a neighbor piconet.

Referring to FIG. 5, a network includes a parent piconet 510 and a neighbor piconet 520. Since the two piconets have a parent/neighbor relationship, the two piconets share a frequency band. By sharing the frequency band, a parent PNC 511 operates using the TDMA method, and one CTA is allocated to a neighbor PNC 521. The PNC 521 operates using the CSMA/CA method in the allocated CTA.

A first device 512 communicates with isochronous data suitable for the TDMA method, and is thus a member of the parent piconet 510. A third device 522 communicates with asynchronous data suitable for the CSMA/CA method, and is thus a member of the neighbor piconet 520. A second device 513 simultaneously communicates with the isochronous/asynchronous data, and is thus a member of the two piconets 510 and 520.

Figure 6:
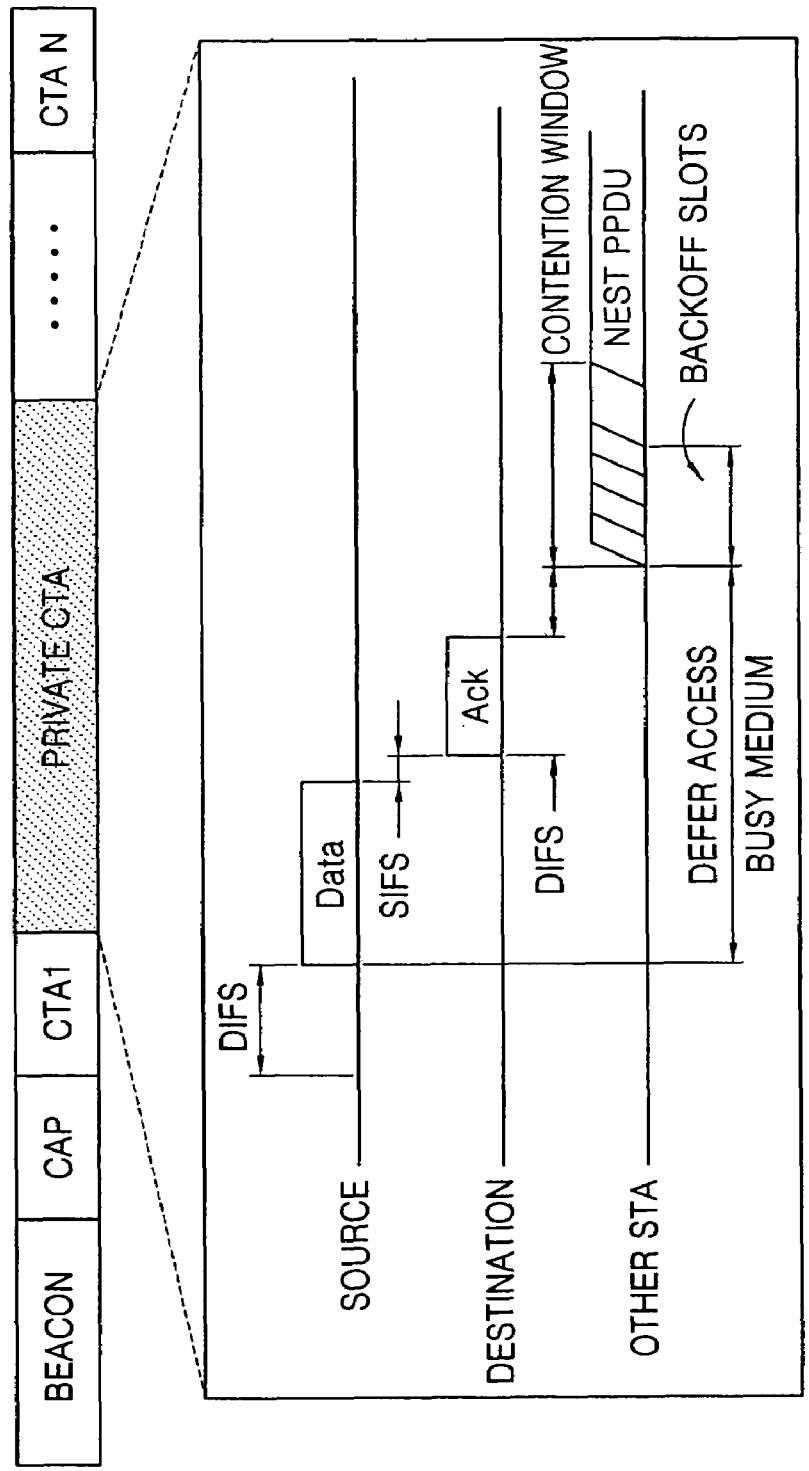
FIG. 6 illustrates a CSMA/CA piconet frame operation in a private CTA.

FIG. 6 illustrates a CSMA/CA piconet frame operation in a private CTA.

Referring to FIG. 6, a parent piconet operates using the TDMA method and allocates one CTA (a private CTA) of a superframe to a neighbor PNC. The neighbor PNC operates using the CSMA/CA method using the allocated CTA. Each device can be registered in the parent piconet or a neighbor piconet according to characteristics of an application to which the device is applied.

Figure 7:
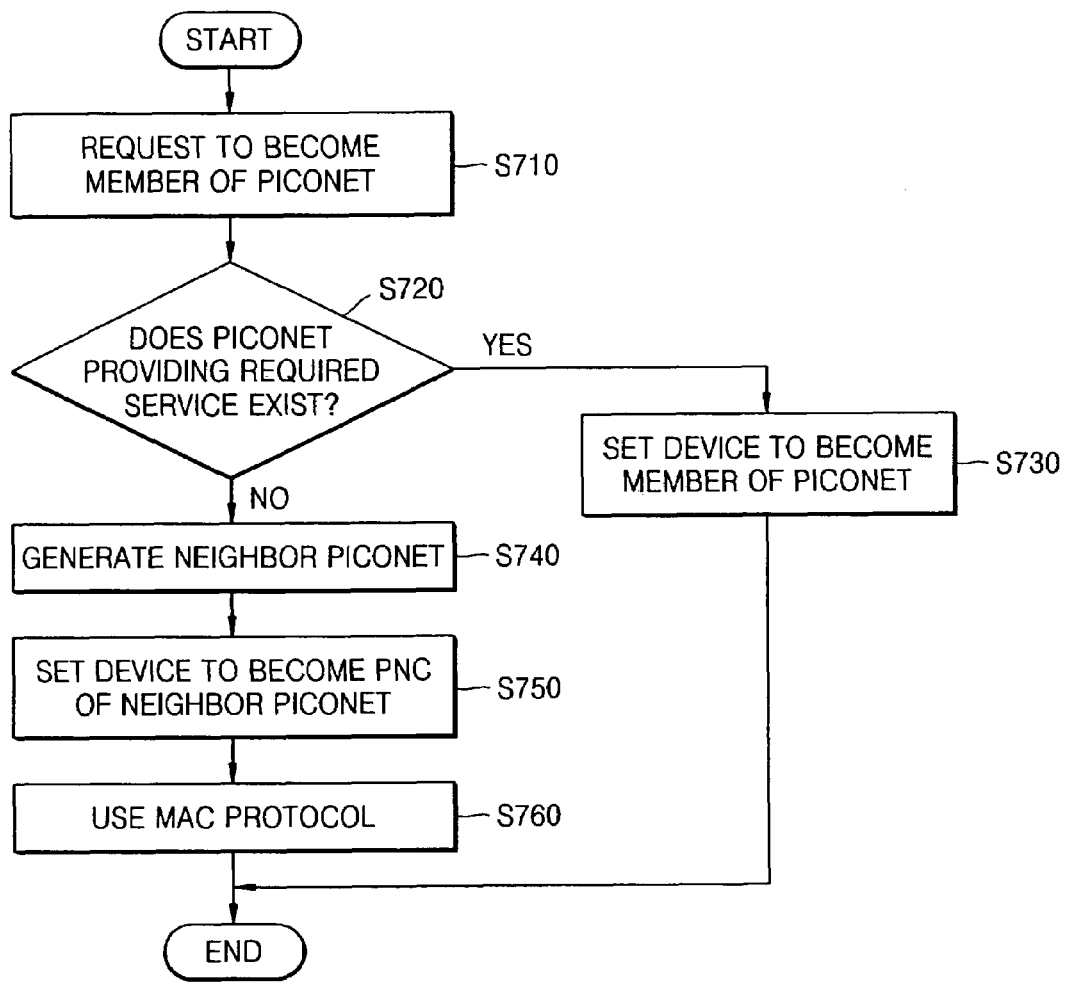
FIG. 7 is a flowchart illustrating a channel time allocation method according to an embodiment of the present invention.

FIG. 7 is a flowchart illustrating a channel time allocation method according to an embodiment of the present invention.

A device requests to become a member of a piconet using the TDMA method in step S710. Since a service required by the device can be an asynchronous data service or an isochronous data service, the device must be a member of each piconet according to the service required. In other words, service is classified according to characteristics of application data and the device is grouped according to a quality of service (QoS) of the service.

In step S720, it is determined whether a piconet providing the requested service exists. If a piconet providing the requested service exists, a procedure of registering in the piconet is performed in step S730. If the piconet of the requested service does not exist, a neighbor piconet is generated in step S740. That is, the neighbor piconet is generated using a CTA allocated from a parent piconet. Then, the device becomes a PNC of the neighbor piconet in step S750.

The PNC of the neighbor piconet uses a MAC (for example, CSMA/CA) protocol suitable for characteristics of a new service group in step S760. When the device withdraws, the neighbor piconet withdraws according to a conventional method.

Figure 8:
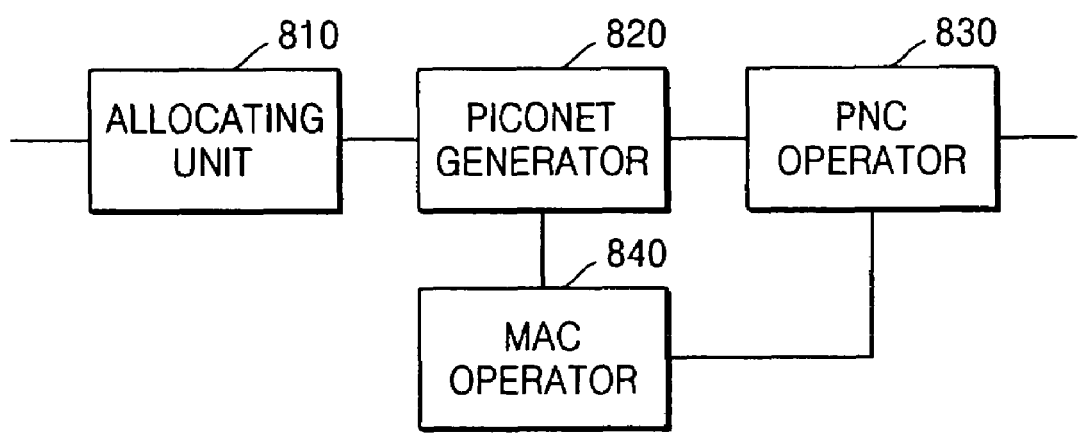
FIG. 8 is a block diagram of a channel time allocation apparatus according to an embodiment of the present invention.

FIG. 8 is a block diagram of a channel time allocation apparatus according to an embodiment of the present invention.

The channel time allocation apparatus includes an allocating unit 810, a piconet generator 820, a PNC operator 830, and a MAC operator 840. The allocating unit 810 receives a request to join a piconet from a device. Since a service required by the device can include an asynchronous data service and an isochronous data service, the device must be made a member of piconets according to a requested service. The allocating unit 810 determines whether a piconet providing the requested service exists. If the piconet providing the requested service exists, the allocating unit 810 performs a procedure of making the device a member of the piconet.

The piconet generator 820 generates a neighbor piconet when a piconet supplying the requested service does not exist. That is, the neighbor piconet is generated using a CTA allocated by a parent piconet. The PNC operator 830 sets the device as a PNC of the neighbor piconet after the neighbor piconet is generated and operates as a PNC. The MAC operator 840 assigns a MAC protocol to the PNC of the neighbor piconet (for example, CSMA/CA) suitable for characteristics of a service group.

The present invention can use a combination of hardware and software components. The software can be embodied as computer readable code on a computer readable medium. The computer readable medium is any data storage device that can store data that can thereafter be read by a computer system. Examples of the computer readable medium include read-only memory, random-access memory, CD-ROMs, magnetic tape, optical data storage devices. The computer readable medium can also be distributed over a network coupled computer system so that the computer readable code is stored and executed in distributed fashion. Code and code segments required for embodying the present invention can be easily deducted by a programmer of ordinary skill in the art.

As described above, according to the present invention, since a suitable MAC protocol can be implemented according to a requested service, optimum performance is achieved. Since a method according to the present invention can use existing MAC protocols, the method can supply a proper service in a network environment in which different kinds of services coexist.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A channel time allocation method comprising:
   (a) receiving a request to become a member of a network from a device;
   (b) determining whether the network supplying a service requested by the device exists; and
   (c) if the network supplying the requested service exists, allowing the device to become the member of the network, and if the network supplying the requested service does not exist, generating a new network,
   wherein the new network is generated by obtaining a channel time allocation (CTA).

2. The channel time allocation method of claim 1, wherein the network is a piconet and the new network is a neighbor piconet.

3. The channel time allocation method of claim 2, wherein, in (c), the neighbor piconet is generated by obtaining the CTA from a parent piconet.

4. The channel time allocation method of claim 2, further comprising:
   (d) setting the device to be a piconet coordinator (PNC) of the neighbor piconet after the neighbor piconet is generated.

5. The channel time allocation method of claim 2, wherein the neighbor piconet uses a medium access control (MAC) protocol different from that used by the parent piconet.

6. The channel time allocation method of claim 1, wherein the service is classified according to characteristics of application data and the device is grouped according to a quality of service (QoS) of the service.

7. The channel time allocation method of claim 6, wherein the application data is classified into one of isochronous data and asynchronous data.

8. The channel time allocation method of claim 1, wherein the new network is a wireless network.

9. The channel time allocation method of claim 1, wherein the generating a new network comprises creating a new network.

10. The channel time allocation method of claim 1, wherein the new network uses a medium access control (MAC) protocol.

11. The channel time allocation method of claim 10, wherein the MAC protocol is one of carrier sense multiple access with collision avoidance and time division multiple access.

12. The channel time allocation method of claim 1, wherein if the new network is generated, the device becomes a network coordinator of the new network.

13. A channel time allocation apparatus comprising:
   an allocating unit, which receives a request from a device to become a member of a piconet;
   a piconet generator, which generates a neighbor piconet when a piconet supplying a service requested by the device does not exist;
   a piconet coordinator (PNC) operator, which sets the device to be a PNC of the neighbor piconet after the neighbor piconet is generated and operate as a PNC; and
   a medium access control (MAC) operator, which assigns a MAC protocol to the PNC of the neighbor piconet suitable for characteristics of the service,
   wherein the neighbor piconet is generated by obtaining a channel time allocation (CTA).

14. The channel time allocation apparatus of claim 13, wherein the piconet generator generates the neighbor piconet by obtaining the CTA from a parent piconet.

15. The channel time allocation apparatus of claim 13, wherein the MAC operator assigns a MAC protocol different from that used by the parent piconet.

16. The channel time allocation apparatus of claim 13, wherein the service is classified according to characteristics of application data and the device is grouped according to a quality of service (QoS) of the service.

17. The channel time allocation apparatus of claim 16, wherein the application data is classified into one of isochronous data and asynchronous data.

18. A computer readable medium having recorded thereon a computer readable program for performing the method of channel time allocation, the method comprising:
   receiving a request to become a member of a network from a device;
   determining whether the network supplying a service requested by the device exists; and
   if the network supplying the requested service exists, allowing the device to become the member of the network, and if the network supplying the requested service does not exist, generating a new network,
   wherein the new network is generated by obtaining a channel time allocation (CTA).

* * * * *